Feb. 20, 1940.　　　　P. U. LANNERD　　　　2,191,215
AUTOMATIC PHONOGRAPH MECHANISM
Filed April 20, 1936　　　　4 Sheets-Sheet 1
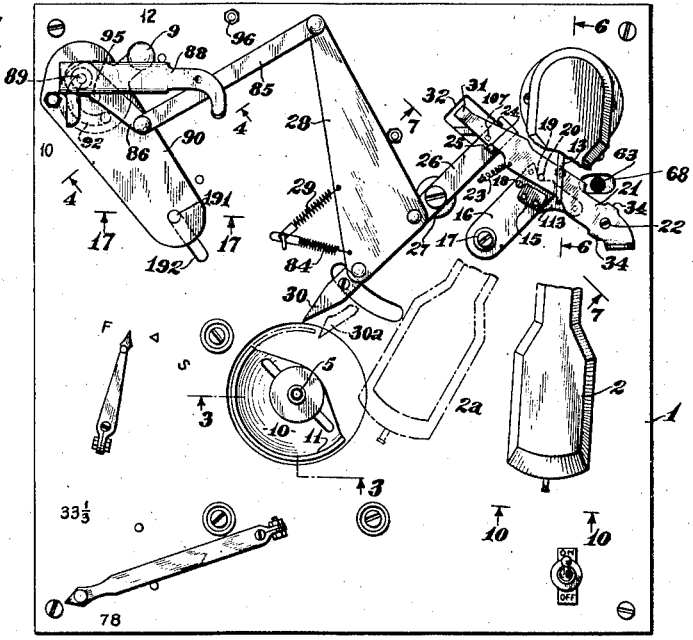
Fig.1.
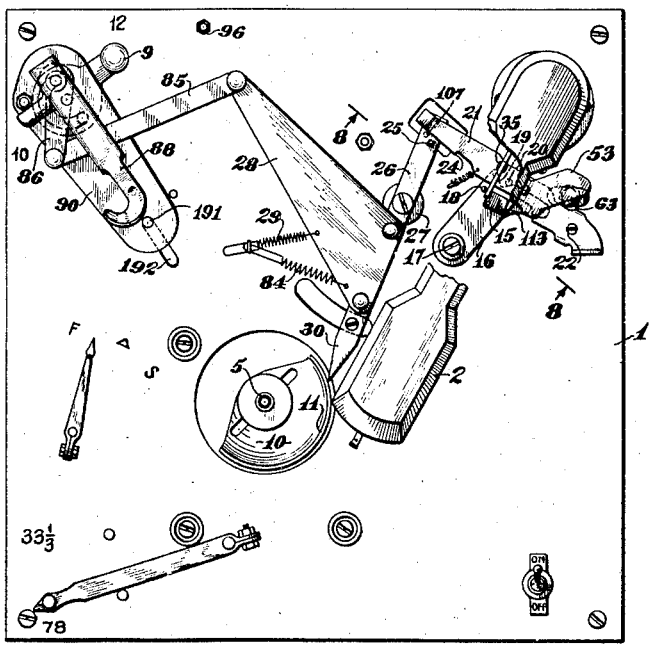
Fig.2.
Fig.17.　　Fig.19.
INVENTOR.
Paul U. Lannerd.
BY Slough and Canfield
ATTORNEY.

Feb. 20, 1940.  P. U. LANNERD  2,191,215

AUTOMATIC PHONOGRAPH MECHANISM

Filed April 20, 1936  4 Sheets-Sheet 2

INVENTOR.
Paul U. Lannerd.
BY Slaugh and Canfield
ATTORNEY.

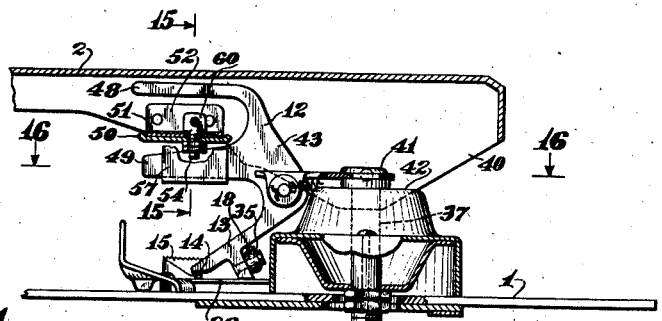
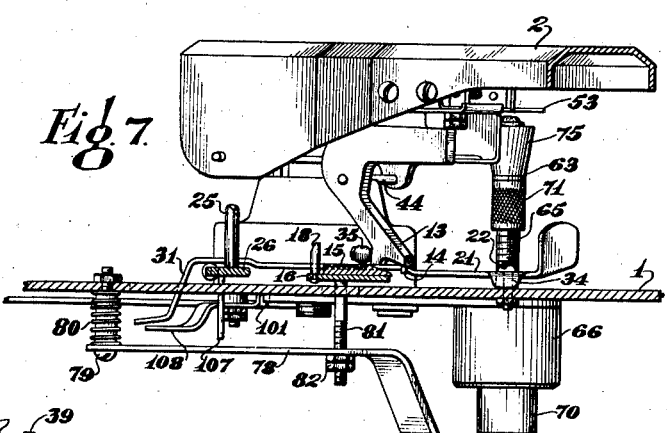
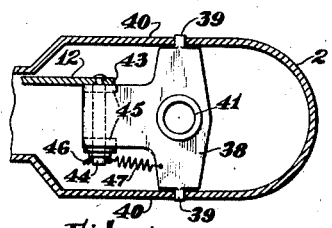
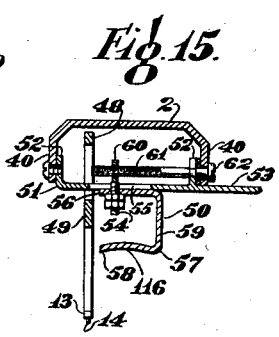
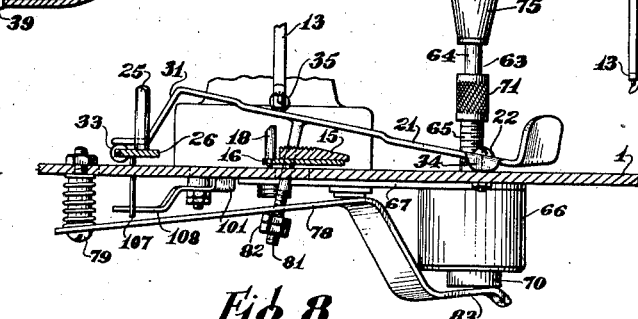
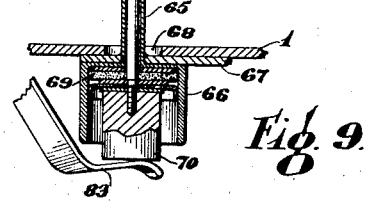

Feb. 20, 1940.                P. U. LANNERD                2,191,215
                    AUTOMATIC PHONOGRAPH MECHANISM
                    Filed April 20, 1936        4 Sheets-Sheet 4

INVENTOR.
Paul U Lannerd.
BY Slough and Caufield
ATTORNEY.

Patented Feb. 20, 1940

2,191,215

UNITED STATES PATENT OFFICE 2,191,215

AUTOMATIC PHONOGRAPH MECHANISM

Paul U. Lannerd, Elyria, Ohio, assignor to The General Industries Company, Elyria, Ohio, a corporation of Ohio Application April 20, 1936, Serial No. 75,359

23 Claims. (Cl. 274—10)

This invention relates to phonograph mechanisms and particularly to phonograph mechanisms whereby a plurality of records of the disc type may be played, one after the other, automatically.

Heretofore, phonograph mechanisms of this class have been proposed whereby a pile or tier of disc-type records may be placed on the phonograph turntable and played one after the other automatically, the record which has been played being automatically discharged from the pile or tier into a suitable receptacle, and after each record is played, the reproducing head of the phonograph being returned to the starting point of the next record in the pile.

In some such prior phonograph mechanisms, provision has been made for the automatic playing and removing of records of two sizes or diameters, for example ten inch and twelve inch records; but in such prior mechanisms, when it is desired to change, say, from playing ten inch records to playing twelve inch records, it has been necessary to adjust both the record discharging mechanism and the reproducing head positioning mechanism to adapt them to the different size of records; and the same has been true in going back from twelve inch records to ten inch records.

It is therefore an object of the present invention to provide an improved phonograph mechanism of the class referred to having improved means whereby, by means of a single operative change or adjusting means, both the record discharging mechanism and the reproducing head positioning mechanism may be changed to adapt them to a change of size of record.

Another object is to provide, in a phonograph mechanism of the class referred to, having a record discharging mechanism adaptable to be positioned for discharging records of different sizes, improved means whereby when the record discharging mechanism is changed, the reproducing head positioning mechanism will automatically be changed to correctly position the reproducing head for the change of size of record.

Another object is to provide, in a phonograph mechanism of the class referred to, improved means for lowering the needle of the reproducing head upon the record to be played.

Another object is to provide, in a mechanism of the class referred to, improved means for supporting the reproducing tone arm in non-operating position.

Another object is to provide, in a mechanism of the class referred to, an improved unitary construction of dash-pot type of tone arm lowering mechanism.

Another object is to provide generally an improved mechanism of the class referred to.

Other objects will be apparent to those skilled in the art to which my invention appertains.

My invention is fully disclosed in the following description taken in connection with the accompanying drawings, in which:

Fig. 1 is a top plan view of the main panel of a phonograph mechanism embodying my invention with the turntable of the mechanism removed for clearness and illustrating the position which parts thereof assume during the playing of a twelve inch record;

Fig. 2 is a view similar to Fig. 1 illustrating the position of the parts during the discharge of a played record;

Fig. 6 is a fragmentary sectional view taken from the plane 6—6 of Fig. 1;

Fig. 7 is a fragmentary sectional view taken from the plane 7—7 of Fig. 1;

Fig. 8 is a fragmentary sectional view taken from the plane 8—8 of Fig. 2, and corresponding to Fig. 7 but with the parts in different positions;

Fig. 9 is a longitudinal sectional view of a part of a tone arm lowering mechanism, the parts being shown in elevation in Figs. 7 and 8;

Fig. 15 is a sectional view taken from the plane 15—15 of Fig. 6 with parts behind the section plane omitted;

Fig. 16 is a sectional view taken from the plane 16—16 of Fig. 6 with parts behind the section plane omitted;

Fig. 17 is a fragmentary sectional view taken from the plane 17—17 of Fig. 1;

Fig. 19 is a plan view illustrating separately an element illustrated in Figs. 1 and 2 in cooperative position with other elements.

Figure 11:
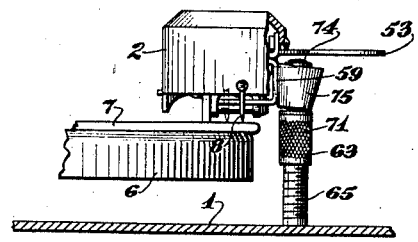
Fig. 11 is a view of the parts of Fig. 10 but in the tone arm lowered position with the needle engaging the record to be reproduced.
Figure 3:
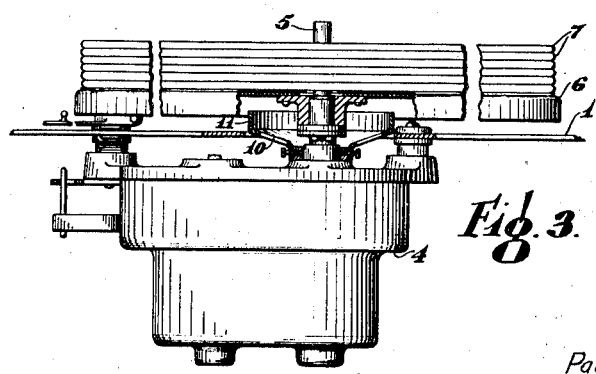
Fig. 3 is a fragmentary view taken approximately from the plane 3—3 of Fig. 1 illustrating a part of the turntable omitted from Fig. 1 and a turntable driving mechanism under the panel of Fig. 1.
Figure 12:
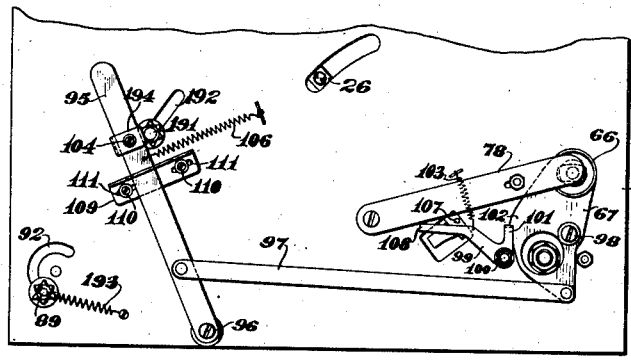
Fig. 12 is a view illustrating mechanism on the under side or opposite side of the panel of Fig. 1, with the parts in the position for reproducing a twelve inch record.
Figure 14:
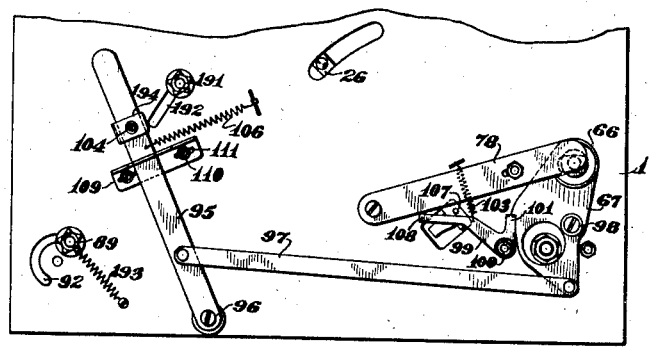
Fig. 14 is a view illustrating the mechanism parts in the transition from the position for reproducing twelve inch records to the position for reproducing ten inch records.
Figure 13:
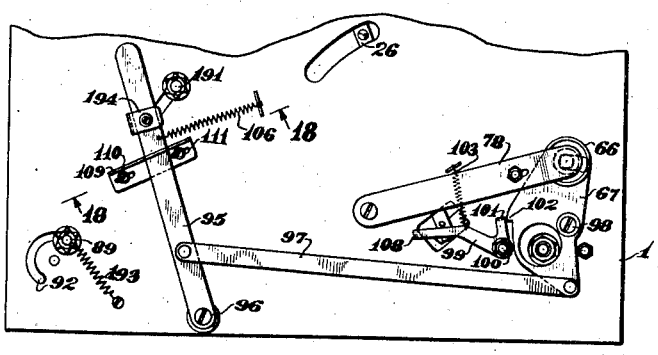
Fig. 13 is a view of the parts of Fig. 12 in the position for reproducing a ten inch record.

Referring to the drawings, I have shown at 1 a panel preferably made from sheet metal upon which the principal parts of the mechanism to be described are mounted and supported, some on the upper side as shown in Figs. 1 and 2 and some on the under side as shown in Figs. 12 to 14. The panel 1 may be mounted in any desirable cabinet, portable or otherwise, and the reproducing arm indicated generally at 1 may be of the type adapted to energize a remotely disposed amplifier or loud speaker. On the under side of the turntable 1, Fig. 3, is mounted a motor 4 driving a turntable shaft 5 which projects upwardly through the panel 1 and rotatably drives the turntable 6 upon which may be placed a pile or tier of disc-form records 7—7. In a manner to be described, the needle 8, Figs. 10 and 11, of the reproducing arm 2 engages the record groove of the uppermost record 7, reproducing the same, and at the end of the reproduction, the reproducing arm 2 which may be referred to in some instances as the tone arm, is first elevated from the record and swung toward its starting position and at the same time the finished record is lifted from the pile and discharged laterally from the pile and the needle 8 is lowered again upon the next record of the pile at the beginning thereof. Thus, the entire tier of records may be played one after the other automatically.

Figure 5:
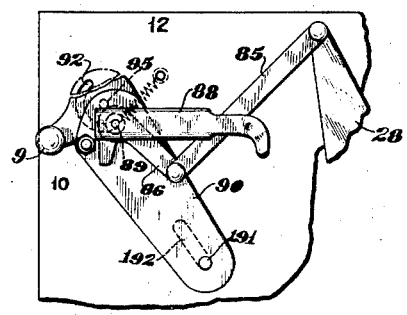
Fig. 5 is a fragmentary view similar to a part of Fig. 1 illustrating the record discharging mechanism in the position to discharge ten inch records.

By means of a lever 9 which may be moved from one position shown in Figs. 1 and 2 to another position shown in Fig. 5, the mechanism may be changed to adapt it respectively to reproduce and discharge records of two different sizes, this one change or adjustment changing both the record discharge mechanism and the mechanism which positions the tone arm at the beginning of the record.

In my copending application Serial No. 732,248, filed June 25, 1934, for improvements in Phonograph record changing mechanism, I have illustrated and described a mechanism which can be changed from the reproducing and discharging of one size of records to reproducing and discharging another size of records, the apparatus being generally of the type herein illustrated and described. In that mechanism, both the record discharging elements and the tone arm positioning elements must be separately adjusted or positioned. The invention of the present application, therefore, may be considered as an improvement of the mechanism of said application and reference may be had thereto for a more complete description of parts which are herein briefly described.

The motor 4 besides driving the shaft 5 drives a rotary head 10 having an upstanding flange 11 approximately semi-cylindrical in form and rotatable by the motor 4 preferably co-axially with the shaft 5, the flange 11 projecting upwardly above the upper surface of the panel 1 as shown in Fig. 3.

The tone arm 2 at the beginning of a record occupies the solid line position of Fig. 1 with the needle resting on the record (not shown). As the motor drives the turntable and the uppermost record therewith, the needle follows the spiral groove of the record and the arm 2 is slowly propelled clockwise toward the position 2a, at which the needle reaches the terminal groove of the record. Such terminal grooves as is well known may be slightly out of round, in which case the tone arm will be oscillated in the position 2a, or the final groove may be spiral in which case the tone arm in the position 2a may be given a quick clockwise movement.

The tone arm 2 carries thereon a three-prong device 12, to be more fully described, one prong of which has a tooth 14 projecting downwardly therefrom. When the tone arm 2 reaches the end of the record, of the type which oscillates the arm, the tooth 14 will ride up on a ratchet plate 15 mounted upon an arm 16 pivoted at 17 on the panel 1 and will, by ratcheting engagement with teeth on the ratchet plate 15, move the arm 16 clockwise. If the terminal groove is of the spiral kind, the prong 13 will engage an upstanding post 18 on the arm 16 and move the arm counter-clockwise as viewed in Fig. 1, or toward the left as viewed in Figs. 7 and 8. The end of the arm 16 remote from the pivot 17 has a V-form cam notch 19 therein in which is engaged a pin 20 on an arm 21 pivoted on the panel 1 by a screw 22 which, in an enlarged perforation in the arm 21, permits the arm to oscillate horizontally thereon and also permits it to oscillate vertically, for example from the position shown in Fig. 7 to that shown in Fig. 8. A movement of the arm 16 in either direction therefore will cause the cam notch 19 to act on the pin 20 and move the arm 21 clockwise as viewed in Figs. 1 and 2.

A spring 23 acts constantly to yieldably hold the arm 21 in the counter-clockwise direction with the pin 21 against the cam notch 19 so as always to return it thereinto but to allow it to ride thereoutof.

When the arm 21 is thus rocked clockwise, it removes a hook 24, Figs. 1 and 2, from engagement with a post 25 (see also Figs. 7 and 8) projecting upwardly from a lever 26 which is pivoted on the panel 1 at 27 to oscillate horizontally. The lever 26 has an arm 28 projecting laterally therefrom and a spring 29 constantly urges the arm 28 and lever 26 to rotate counter-clockwise on the pivot 27 so that when the post 25 is released from the hook 24, the arm 26 moves counter-clockwise under the impulsion of the spring 29 and a pointed end 30 thereof is thereby moved from the solid line position 30 to the broken line position 30a of Fig. 1, and in the latter position is in the rotational path of the head flange 11.

On the completion of its revolution, the head flange engages the pointed end at 30a and forcibly oscillates the arm 26 counter-clockwise carrying the pointed end to the position shown in Fig. 2 where it rides upon the outer periphery of the flange 11 through a substantial part of the same revolution. This forced power-effected counter-clockwise oscillation of the arm 26 moves the end of the arm 26 opposite the point 30, into engagement with a depending cam portion 31 of the arm 21 which projects downwardly through a perforation 32 in the panel 1 and thereby lifts the end of the arm 21 around the screw 22, the movement being facilitated by a roller 33 on the arm 26, and by depending ears 34—34 on the arm 21, these parts being shown clearly in Figs. 7 and 8 in connection with Fig. 1.

The prong 13 of the device 12 on the tone arm 2 above referred to is provided with a roller 35 disposed above the arm 21 and the rising arm 21 engages the roller and moves it upwardly from the position in Fig. 7 to the position in Fig. 8, thereby raising the tone arm or rocking it around its pivot 36 and supporting the tone arm in its elevated position upon the roller. The arm 21 is now inclined as shown in Fig. 8, and by gravity, the arm supported on the roller 35 rolls downwardly on the arm 21 concurrently rotating it counter-clockwise around its vertical pivot 37 from the position 2a of Fig. 1 or 2 to the position 2 of Fig. 1.

As the tone arm 2 rotates counter-clockwise to its starting position, pivoting around the vertical axis 37, and as the roller 35 rolls down the inclined arm 21, the tone arm 2 also pivots around a horizontal axis. This construction of axes is illustrated in Figs. 6 and 16. A plate 38 has trunnions 39—39 formed thereon, the trunnions projecting through perforations in side walls 40—40 of the sheet metal press-formed tone arm 2 upon which trunnions 39—39 the tone arm may oscillate vertically. The plate 38 is secured to the upper end of a post 41 having oscillatory bearing in vertically spaced portions of a sheet metal housing 42 which is rigidly secured in position on the plate 1 in any suitable manner. The plate 38 may therefore oscillate horizontally to give oscillatory movement to the trunnion-supported arm 2.

The device 12 above referred to comprises generally a body portion 43 pivoted for oscillation on a horizontal axis by means of a pin 44 rigidly secured to the body 43 at one end and having oscillatory bearing in a pair of spaced depending ears 45 formed integral with the plate 38, Figs. 6 and 16. A cotter pin 46 is projected through the pin 44 to retain it in the bearing ears 45 and one end of a tension spring 47 is secured to the eye of the cotter pin at one end and at the other end to the plate 38, and acting through the pin, holds the device 12 yieldingly in the counter-clockwise direction as viewed in Fig. 6 for the purposes above described.

Besides the lower prong 13 above described, the device 12 has an upper prong 48 and an intermediate prong 49 extending forwardly therefrom. The prongs 48 and 49 and 13 cooperate with a stop device shown generally at 50, Figs. 6, 10, 11 and 15, and comprise the following parts. A bracket 51 is secured by upstanding ears 52—52 to the depending side walls 40—40 of the tone arm 2 and has, preferably integral therewith, a wing 53 extending laterally from the arm. A screw 54 is projected downwardly through a transverse slot 55 in the bracket 51 and through a perforation in the upper leg of a horizontal disposed U-form stop member 57 having a lower leg 58, and the intermediate or closed portion of the U being disposed vertically as at 59 and constituting a stop. The upper end of the screw 54 is enlarged into a head 60 which overlaps the sides of the slot 55, and a pair of lock nuts on the screw under the stop member leg 55 mount the screw 54 for movement bodily with the stop member 57 and in the slot 55 relative to the bracket 51 and tone arm 2; and by means of a screw 61 threaded in the head 60 and rotatably mounted in one of the ears 52 and the arm side wall 40 and giving access externally to a screw slot 62 therein for turning the screw, the head 60 and therefore the entire stop member 57 may be adjusted transversely of the arm to adjustably position the stop 59 thereof for a purpose to be described.

The prong 48 above referred to projects forwardly above the bracket 51 and if the tone arm 2 be raised manually, will be engaged by the bracket and on continued upward movement of the arm will rock the device 12 clockwise as viewed in Fig. 6 to lift the tooth 14 and other parts of the prong 13 clear of the underlying parts so that the tone arm may be swung manually freely. The prong 49 is disposed under the bracket 51 and upon elevation of the prong 13 by elevation of the arm 21 to the position shown in Fig. 8, the prong 49 will be moved upwardly and engage the bracket 51, and by this means when the prong 13 is raised, the prong 49 will raise the tone arm 2 in the operation thereof above described. In the normal operation of the tone arm while reproducing a record, the prong 48 remains out of engagement with the tone arm or the bracket 51, and the prong 49 is disposed out of engagement with the bracket 51 as clearly illustrated in Figs. 6 and 15.

As above described, the tone arm is swung toward its starting position by the gravity-induced downward rolling of the roller 35 and prong 13 on the inclined arm 21, the arm having been elevated at the end of a record reproduction by the up thrust on the prong 13 effected by elevation of the arm 21 and by the prong 49 thereupon thrusting upwardly on the bracket 51. When the arm has swung and moved down the incline 21, the stop 59 above described on the underside of the tone arm engages the upper end of a stop post shown generally at 63, the wing 53 overlapping the upper end of the post.

By the construction to be described, the post is first elevated to this receiving position and support of the tone arm by the elevated arm 21 is withdrawn, transferring the support of the arm by means of the wing 53 to the post 63. The post 63 then descends depositing the needle upon the margin of the next record to be played, and then moving it into the record groove (the record which has been played having been in the meantime removed by means to be described).

The stop post 63 (see Figs. 7, 8, 9, 10, 11) comprises a piston rod 64 reciprocable in a tubular guide 65 secured at its lower end to or formed integrally with an enlarged cylinder 66 secured to a plate 67 on the underside of the panel 1, the guide 65 projecting upwardly through the panel 1 through a slot or elongated perforation 68. On the lower end of the rod 64 is secured a piston fitting the inner wall of the cylinder 66 and weighted by a weight 70 secured to the piston. The construction is such that the piston 69 may be moved upwardly freely, being a one-way piston of any suitable construction; and when the piston is moved downwardly by the weight 70, suction or partial vacuum will be created above the piston and will be relieved by drawing air inwardly through the tubular guide 65 and around the rod 64 which fits loosely in the guide 65 for this purpose, and the escapement thus provided causing the piston 69 to move downwardly with a retarded movement. The upper end of the guide 65 is threaded and a gland nut 71 is threaded thereon and packing 72 is disposed within the nut and at the upper end of the guide 65. By turning the nut 70, the packing 72 may be compressed more or less to seal to a greater or lesser degree the rod 64 in the guide 65 to control the rate of air admission into the guide during the downward movement of the piston to thereby adjustably regulate and control the rate of downward retarded movement of the post 64.

At the upper end of the post is provided a cup 73 in which is disposed a felt or like friction pad 74. A downwardly tapering frusto-conical cup 75 rests upon a flange 76 on the post and is retained yieldingly upright by a spring 77 abutting at opposite ends upon the cup bottom and upon the cup 73.

Under the panel 1, as best shown in Figs. 7 and 8, a bar 78 is supported, hinged at one end upon a screw 79 secured to the panel and depending therefrom, and having a spring 80 abutting between the panel and the bar end to yieldingly and cushioningly support the bar end. A hanger 81 is secured at its upper end to the underside of the arm 21 and projects downwardly through a suitable perforation in the panel 1 and through a perforation in the bar 78, and supports the bar by a pair of lock nuts 82 thereon under the bar. The free end of the bar 78 is bent downwardly and provided with a finger 83 disposed under the above-described weight 71 which projects downwardly out of the cylinder 66.

When, as above described, the arm 21 is elevated, the hanger 81 raises the finger 83 which engages the weight 70 and elevates it, elevating the piston rod 64 and the pad 74 and cup 75 therewith. As described above, the arm 21 is elevated by oscillating movement of the arm 26, Figs. 1 and 2, the pointed end 30 of which was engaged by the head flange 11. It will be understood, of course, that this condition continues only while the head flange 11 is turning through a part of a revolution, and when this has been completed, and the head flange moves out of engagement with the pointed end 30, a second spring 84 which was put under tension by the movement of the arm 26, now retracts the arm to its original position of Fig. 1, thus withdrawing the opposite end of the arm 26 from under the arm 21 (see also Fig. 8), allowing the arm 21 to fall, this action occurring after the tone arm has been returned as above described to its starting position. When, therefore, the arm 21 falls to deposit the tone arm on the upper end of the stop post, shown generally at 63, the support of the bar 78 by the hanger 81 is also withdrawn, the parts moving from the position of Fig. 8 to that of Fig. 7 and the finger 83 is withdrawn from the weight 70.

Figure 10:
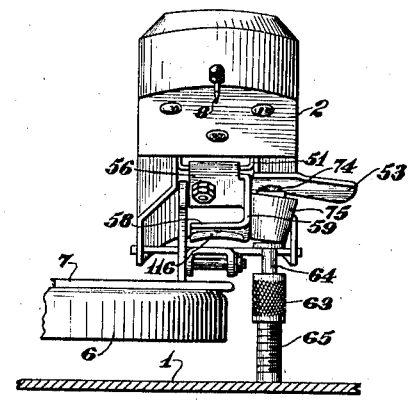
Fig. 10 is a front elevational view of the phonograph mechanism tone arm in stopped returned position which it assumes when about to be lowered by the record, the view being taken approximately from the plane 10—10 of Fig. 1 with parts back of the plane omitted for clearness.

The parts thus far described, therefore, are all now in their original position except that the tone arm is supported on the post, as shown in Figs. 7 and 10.

The swing of the arm 2 when stopped by the post 63 rocks the cup 75 from its normal position to that shown in Figs. 10 and 11, and the finger 83 rests upon the pad 74. The weight of the arm depresses the rod 64 with a retarded movement as above described and the tone arm slowly moves downwardly until the needle 8 rests upon the record, the parts moving from the position of Fig. 10 to that of Fig. 11.

The weight 70 continues the downward movement of the pad 74 until it clears the wing 53 as shown in Fig. 7.

The end of the tone arm is now supported on the needle 8 upon the margin of the record and the cup 75 in righting itself under impulsion of the spring 77 to its normal vertical position, reacts upon the stop 59 and pushes the arm and the needle over sufficiently to engage the needle with the origin of the record groove to start the reproduction thereof.

The lowermost position of the pad 74 is low enough to deposit the needle upon the last record of the tier as shown in Fig. 11 and therefore obviously it will deposit the needle upon the uppermost record of a pile.

Referring to Fig. 9, the cylinder 66 and tubular guide 65 are secured to the plate 67, and as will be described hereinafter, the plate is removable from the panel 1 and the perforation 68 is large enough for the cup 75 to be withdrawn downwardly therethrough; and by this construction, the entire retarding cylinder and piston construction may be manufactured and adjusted as a unit and assembled or removed with the panel 1 as a unit with the advantages attending such unit manufacture and assembly, which are well known.

When, as above described in connection with Figs. 1 and 2, the lever 26 is oscillated by the head flange 11 from the position of Fig. 1 to that of Fig. 2, to effect returning of the tone arm to the starting position, the top-most record of the tier of records is removed by record discharge mechanism which will be described.

Figure 4:
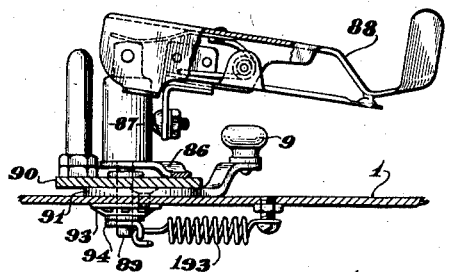
Fig. 4 is a sectional view taken from the plane 4—4 of Fig. 1.

The arm 28 which is attached to the lever 26 and which moves therewith acts through a link 85 and a crank 86 to rotate a post 87 (see also Fig. 4) upon which is vertically oscillatably mounted a record pick-up arm 88. When the pick-up arm is rotated with the post from the position of Fig. 1 to that of Fig. 2, the end of the pick-up arm will engage the edge of the top-most record and the rotation of the underlying records will cause the top-most record to be removed laterally from the pile, this part of the mechanism and the operation thereof being substantially the same as that described in the above mentioned pending application and reference may be had thereto for a more complete description.

The pick-up arm 88 and post 87 may be adjusted radially toward and from the turntable center to adapt it to discharge two sizes of records such as twelve inch and ten inch by the following means. A pin 89, Fig. 4, extends downwardly from the post 87 through a perforation in an elongated plate 90 and through a perforation in a disc 91 resting on the panel 1 and thence through an arcuate slot in the panel 1, the pin 89 being held downwardly to hold the parts described together by a spring washer 93 on the underside of the panel 1, and a cotter pin 94 projected through the pin below the washer. The disc 91 is pivotally mounted on the panel 1 by a screw eccentric to the pin 89 and the handle 9 above-mentioned is secured to the disc extending laterally therefrom. When the handle 9 is rotated or oscillated from the position of Fig. 1 to that of Fig. 5, the pin 89 will be moved through the arcuate slot 92 and carry the pin 89 and therefore the post 87 from a position remote from the turntable to a position nearer to it to correspondingly position the pick-up arm 88. During said adjusting movement, the plate 90 is guided by a pin 191 thereon projecting downwardly through and moving radially of the turntable in a slot 192 in the panel 1.

A spring 193, connected at one end to the panel 1 and at the other end to the cotter pin 94, exerts tension on the pin 89 to hold it in the extreme end of the arcuate slot 192 to hold the parts including the handle 9 in their opposite adjusted positions and to insure a complete throw of the handle 9 in each direction.

As above referred to, when the pick-up arm 88 is adjusted radially to adapt it to the removal of different sizes of records, the tone arm receiving post 63 is simultaneously and by the same means adjusted in position to stop and position the tone arm for the two sizes of records, and the mechanism for this purpose will now be described particularly in connection with Figs. 12, 13 and 14.

At any time when the handle 9 is adjusted to the large-diameter-record position of Fig. 1 and the pin 191 is retracted outwardly in the slot 192, the pin 191 engages an abutment 194 on an arm 95 pivoted at one end as at 96 to the underside of the panel 1 and moves the arm 95 to a counter-clockwise position shown in Fig. 12 as viewed from the underside of the panel, the parts in that view as well as in Figs. 13 and 14 appearing as if the panel of Fig. 1 were hingingly rotated upwardly around its upper edge.

The movement thus given to the arm 95 is communicated by a link 97 to the dash-pot plate 67 above described, which is pivoted to the underside of the panel 1 at 98 and rocks the plate clockwise as viewed in Figs. 12 to 14, which moves the dash-pot 66 (and therewith the stop post 63 above described) in a direction farther from the turntable center so as to position the tone arm for twelve inch records.

When the plate 67 is rocked to this position, it is latched therein by a bell crank form latch 99 pivoted on the panel at 100 and comprising a latch arm 101 the end of which is engaged with a tooth 102 on the plate 67 by a tension spring 103 engaged at one end with the latch 99 and at the other end with the panel 1.

To insure that the dash-pot and stop post 63 on the other side of the panel 1 will be in the correct position for stopping the tone arm for twelve inch records, the abutment 194 on the lever 95 may be adjusted as shown in Fig. 17 wherein the abutment comprises a clip having legs straddling the arm 95 and having a screw 104 projected through one leg and screwed into the other and passing through an elongated perforation or slot 105 in the arm 95 whereby upon loosening the screw 104 the abutment 194 may be adjusted toward or from the post 191 to position the arm 95 and therefore, through the link 97, to position the plate 67.

Figure 18:
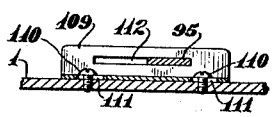
Fig. 18 is a fragmentary sectional view taken from the plane 18—18 of Fig. 13.

When the adjusting arm 9 is moved to the other position for the small or ten inch diameter records, the pin 191 as shown in Fig. 14 and as described in connection with Fig. 5 will be moved to the other end of the slot 192; and a tension spring 106 engaged at one end with the arm 95 and at the other end with the panel 1, will tend to rock the arm 95 clockwise as viewed in Fig. 14 but it will be prevented from rocking by the link 97 engaged with the latch plate 67 which cannot rock counter-clockwise because of the latch. The record will be played by placing the tone arm manually upon the edge of the smaller diameter record, the first one in the tier of records, and when the record has been completely played and the arm 26, Figs. 1, 2, 7 and 8, is oscillated as above described, a depending pin 107 thereon will engage a trip arm 108 of the bell crank latch 99 and withdraw the latch arm 101 from the tooth 102 of the plate 67 whereupon the tension spring 106 will rock the arm 95, moving the link 97 and rocking the plate 67 to move the dash-pot 66 and stop post 63 nearer the turntable center or in position to stop the reproducing arm 2 in the correct position for the ten inch record. To insure that the stop post 63 will be stopped in the correct position, means is provided to accurately stop the arm 95 as shown in Fig. 18 comprising an angle piece 109 one leg of which is secured to the panel 1 by screws 110 passing through elongated slots 111—111 in said leg, and the other or vertical leg having an elongated slot 112 therein through which the arm 95 projects. When the arm 95 moves therefore from the locked position of Fig. 14 to the released position Fig. 13, the arm 95 will be moved into engagement with the end of the slot 112 by the spring 106 and the final position of the arm in the slot may be adjustably determined by adjustably shifting the angle piece 109 by the screws 110 and slots 111.

For the succeeding small or ten inch records, the parts remain in the position just described.

It will be observed that in adjusting the mechanism from the ten inch to the twelve inch records, the pick-up arm 88 which discharges the records and the stop post 63 which stops the arm, are both changed simultaneously by adjusting the position of the arm 9, but in changing from twelve inch to ten inch records, there is liability that the change-over might be made manually as described when twelve inch records were on the turntable, and in such event, the needle of the reproducing head would be dragged over the record inwardly and mar the record. By the interlock above described, even if the change-over is accidentally made from twelve inch to ten inch while playing a twelve inch record, the stop post 63 will not be moved nor drag the needle over the record, since the moving of the stop post 63 from large diameter to small diameter position can only occur at the finish of a record.

The arrangement referred to also provides for the playing of a twelve inch record followed by one or more ten inch records. In such case, at the time that the twelve inch record is being discharged, the parts can be set for the ten inch record so that when the twelve inch has discharged, the stop post 63 will move into the ten inch position.

The arm 16 above described in connection with Figs. 1 and 2 is shown separately in Fig. 19. A wing 113 extends laterally therefrom at the free end and at spaced points thereon is provided with downwardly projecting dents upon which the free end of the arm 16 may ride or slide upon the upper side of the panel 1 when the arm 16 is oscillated as above described. Also, the wing 113 as well as the end of the arm 16 itself lies under the arm 21. By this means, the arm is rendered stable in its movement and rocking thereof in planes other than the plane of the arm itself is reduced and the operation thereof rendered more reliable.

As shown in Figs. 10 and 15, the lower leg 58 of the stop member 57 is provided with an upwardly concave portion 116. When it is desired to support the tone arm above the record, for example while placing a pile of records on the turntable, the tone arm may be elevated and moved outwardly sidewise and the concave portion 116 of the stop member 57 may be placed upon the upper end of the post 63 to support it and the concavity referred to will render the support secure and remove danger that the tone arm may easily be displaced and fall, with the possibility of injuring the needle or the reproducing head.

I claim:

1. In a phonograph mechanism of the type comprising means for playing and discharging successively a plurality of disc records placed in a pile on a turntable, a record discharging mechanism disposed laterally of the turntable mounted to be moved toward and from the turntable to position it for discharging discs of different diameters, a record reproducing tone arm mounted to swing over the turntable to a record starting position, a stop post mechanism disposed laterally of the turntable for stopping the swing of the arm in said position and for lowering it into engagement with a record and mounted to be moved toward and from the turntable to stop the arm in reproducing position for records of different diameters, and mechanism means to effect moving of one said mechanism toward or from the turntable in correspondence with movement of the other mechanism.

2. In a phonograph mechanism of the type comprising means for playing and discharging successively a plurality of disc records placed in a pile on a turntable, a record discharging mechanism disposed laterally of the turntable mounted to be moved toward and from the turntable to position it for discharging discs of different diameters, a record reproducing tone arm mounted to swing over the turntable to a record starting position, a stop post mechanism disposed laterally of the turntable for stopping the swing of the arm in said position and for lowering it into engagement with a record and mounted to be moved toward and from the turntable to stop the arm in reproducing position for records of different diameters, manual means for moving one mechanism toward and from the turntable and mechanism means interconnecting the two mechanisms to effect a simultaneous corresponding movement of the other mechanism.

3. In a phonograph mechanism of the type comprising means for playing and discharging successively a plurality of disc records placed in a pile on a turntable, a record discharging mechanism disposed laterally of the turntable mounted to be moved toward and from the turntable to position it for discharging discs of different diameters, a record reproducing tone arm mounted to swing over the turntable to a record starting position, automatic means to swing the arm at the end of a record reproduction, a stop post mechanism disposed laterally of the turntable for stopping the swing of the arm in said position and for lowering it into engagement with a record and mounted to be moved toward and from the turntable to stop the arm in reproducing position for records of different diameters, manual means for moving one mechanism to and from the turntable and interconnecting mechanism for effecting corresponding movement of the other mechanism actuated by the automatic tone arm swinging means.

4. In a phonograph mechanism of the disc record and turntable type, a main frame, a tone arm swingable on the frame, automatic mechanism operable to swing the arm from a record finishing to a record starting position, a stop on the arm, a mechanism comprising an element pivoted on the frame, a post on the element at one side of the pivot and in the path of the stop to be engaged thereby to stop the arm, operable means to pivotally move the pivoted element to position the post remote from the turntable, yieldable means tending to move the pivoted element to position the post nearer to the turntable, latch means preventing movement of the pivoted element by the yieldable means, and means to cause the latch means to be tripped by operation of the automatic mechanism to cause the yieldable means to move the pivoted element.

5. In an automatic disc record reproducing turntable type phonograph mechanism, a main frame, a tone arm swingably mounted on the frame, a post supported on the frame for stopping and supporting the arm in a record starting position, stop means on the arm, the stop means comprising a bracket on the arm having a slot therein, a screw rotatably supported on the arm and anchored against longitudinal movement, a nut on the screw having a small diameter shank extending through the slot and reciprocable therein upon turning of the screw, an element connected to the shank beyond the slot having a substantially vertical portion to function as a post-engaging stop.

6. In an automatic disc record reproducing turntable type phonograph mechanism, a main frame, a tone arm swingably mounted on the frame, a post supported on the frame for stopping and supporting the arm in a record starting position, stop means on the arm, the stop means comprising a bracket on the arm having a slot therein, a screw rotatably supported on the arm and anchored against longitudinal movement, a nut on the screw having a small diameter shank extending through the slot and reciprocable therein upon turning of the screw, a U-shaped element connected to the shank beyond the slot and the closed end of the U disposed substantially vertically to function as a post-engaging stop, and the other leg of the U being generally horizontally disposed and having an upwardly concave portion to provide an optional support for the arm engageable with the top of the post upon manual lifting of the arm.

7. In an automatic disc record reproducing turntable type phonograph mechanism, a main frame, a tone arm swingably mounted on the frame, a post supported on the frame for stopping and supporting the arm in a record starting position, stop means on the arm, the stop means comprising a bracket on the arm having a slot therein, a screw rotatably supported on the arm and anchored against longitudinal movement, a nut on the screw having a small diameter shank extending through the slot and reciprocable therein upon turning of the screw, a U-shaped element connected to the shank beyond the slot and the closed end of the U disposed substantially vertically to function as a post-engaging stop, and the bracket having a wing extension for engagement with the top of the post, and the other leg of the U being generally horizontally disposed and having an upwardly concave portion to provide an optional support for the arm engageable with the top of the post upon manual lifting of the arm.

8. In an automatic phonograph mechanism, a main frame, a tone arm having downwardly extending side flanges, a support for the tone arm comprising a generally horizontal plate secured to the frame and having generally horizontal axially aligned trunnions extending laterally therefrom and projecting through corresponding aligned perforations in the arm flanges to provide a horizontal pivot post for the arm, a pair of spaced ears on the plate, a generally horizontal shaft having oscillatory bearing in aligned perforations in the ears, an element secured to the shaft, oscillatable therewith, a tension spring secured to the shaft at one side of its axis and to the plate to yieldably rock the said element in one direction, automatic mechanism to rock the said element in the other direction and the said element having means then engageable with the arm to rock it upwardly on said pivot axis.

9. In a phonograph of the type comprising a generally horizontal panel, automatic mechanism mounted on the panel for elevating and swingably returning a tone arm from record-finishing position to record-starting position, a trip mechanism actuated by movement of the arm at the record-finishing position to effect actuation of the automatic mechanism, the trip mechanism comprising a sheet metal element pivoted at one end upon the panel and at its free end having a post extending upwardly therefrom and laterally of the post having a wing extension, a mechanism arm overlying the said free end, the post being engageable by the tone arm to move the said element, a cam and cam follower one on the free end of the element and the other on the overlying arm to move the overlying arm upon tone-arm-effected movement of the said element, the said wing extension by engagement with the panel and with the overlying arm below and above it respectively, limiting rocking movement of the said element.

10. In an automatic phonograph mechanism, a main frame, a record discharging mechanism for discharging records from a pile on a phonograph turntable movable on the frame to position it near to and remote from the phonograph turntable, a tone arm engageable post supported on the frame laterally of the turntable to move to a position remote from the turntable or to a position nearer thereto, mechanism elements interconnecting the post and an element of the record discharging mechanism, a handle for moving the record discharging mechanism element to position the discharging mechanism and through the interconnecting element to correspondingly position the post, and means for causing the tone arm to be supported by the post out of contact with the record and concurrently causing actuation of the record discharging mechanism.

11. A mechanism as described in claim 10 and in which means is provided to adjust the position of the post in one said position comprising an abutment on one of the interconnecting elements adjustable relative thereto and engageable by the record discharging mechanism element.

12. In an automatic phonograph mechanism, a main frame, a record discharging mechanism for discharging records from a pile on a phonograph turntable movable on the frame to position it near to and remote from the phonograph turntable, a tone arm engageable post supported on the frame laterally of the turntable to move to a position remote from the turntable or to a position nearer thereto, yieldable means acting on the post tending to move it to one position, an element of the record discharging mechanism disposed to overcome the yieldable means upon movement of the record changing mechanism to one position to move the post to the other position, and means causing the tone arm to be supported by the post out of contact with the record and concurrently causing actuation of the record discharging mechanism.

13. In an automatic phonograph mechanism, a main frame, a record discharging mechanism for discharging records from a pile on a phonograph turntable movable on the frame to position it near to and remote from the phonograph turntable, a tone arm engageable post supported on the frame laterally of the turntable to move to a position remote from the turntable or to a position nearer thereto, yieldable means acting on the post tending to move it to one position, an element of the record discharging mechanism disposed to overcome the yieldable means upon movement of the record changing mechanism to one position to move the post to the other position, and upon movement of the record discharging mechanism to the other position permitting the yieldable means to move the post to the said one position, means for causing the tone arm to be supported by the post out of contact with the record and concurrently causing actuation of the record discharging mechanism.

14. In an automatic phonograph mechanism, a main frame, a record discharging mechanism for discharging records from a pile on a phonograph turntable movable on the frame to position it near to and remote from the phonograph turntable, a tone arm engageable post supported on the frame laterally of the turntable to move to a position remote from the turntable or to a position nearer thereto, yieldable means acting on the post tending to move it to one position, an element of the record discharging mechanism disposed to overcome the yieldable means upon movement of the record changing mechanism to one position to move the post to the other position, and upon movement of the record discharging mechanism to the other position permitting the yieldable means to move the post to the said one position, and means to adjust the position of the post in said one position comprising an abutment adjustably secured to the panel and engaged by an element movable with the post, means for causing the tone arm to be supported by the post out of contact with the record and concurrently causing actuation of the record discharging mechanism.

15. In an automatic phonograph mechanism comprising a turntable for supporting a pile of disc records and a swingable tone arm, a record discharging mechanism movable to positions adjacent to and remote from the turntable, a post for stopping movement of the tone arm at a record starting position, a pivoted base supporting the tone arm at a side of the pivot, a pivoted arm, a link connecting the pivoted arm to the base, an element of the record changing mechanism disposed to engage the pivoted arm upon movement of the record changing mechanism to one position, to move the arm to effect movement of the post, through the link and base to one position, a spring tending to move the pivoted arm in the direction to move the base and post to the other position when the record changing mechanism is moved to its other position, and a latch preventing such movement, an automatic mechanism actuated by movement of the tone arm for effecting movement of the tone arm from a record finishing position to a record starting position and into engagement with the post in each position thereof, said latch means being disposed to be tripped by said automatic mechanism when actuated.

16. A mechanism as described in claim 15 and in which means is provided to adjust the post in said one position comprising an abutment adjustably secured to the pivoted arm and engageable by the element of the record changing mechanism.

17. A mechanism as described in claim 15 and in which means is provided to adjust the position of the post in said other position comprising an adjustably fixed stop engageable by the pivoted arm.

18. In an automatic phonograph mechanism of the type comprising a disc record turntable, a main frame and a tone arm mounted on the frame swingable laterally to a record starting position, automatic support means to elevate the tone arm at the completion of a record reproduction and swing it to record starting position while elevated, a stop on the arm, a post movable to an elevated position and movable downwardly by weight imposed thereon, the stop being engageable by the post to position the arm with the elevated post beneath a portion of the arm, means withdrawing the automatic support means with the arm in record starting position to cause the arm to be supported by the post and subsequently lowered with the post due to the weight of the tone arm thereby permitting the arm to contact a record on the turntable, and a support for the post mounted on the frame movable towards and from the turntable to position the arm to reproduce records of different diameters.

19. A mechanism as described in claim 18 and wherein an element supported on the frame is provided having a portion engageable with the post and means linking said element and the automatic support means adapted to elevate said element to raise the post upon elevating movement of the tone arm.

20. An automatic phonograph mechanism of the type comprising a disc record turntable, a main frame and a tone arm mounted on the frame swingable laterally to a record starting position, automatic support means to elevate the tone arm at the completion of a record reproduction and swing it to record starting position while elevated, a stop on the arm, a post movable to an elevated position and movable downwardly by weight imposed thereon, the stop being engageable by the post to position the arm and with the post elevated beneath a portion of the arm, means withdrawing the automatic support means with the arm in record starting position to cause the arm to be supported by the post and subsequently lowered with the post due to the weight of the tone arm thereby permitting the arm to contact a record on the turntable, a support mechanism for the post comprising an element pivoted on the main frame with the pivotal axis spaced from the post, and means to pivotally move and position the pivoted element to position the post nearer to or farther from the turntable.

21. In a record-reproducing mechanism, a turntable for supporting records, a tone-arm pivotally mounted adjacent said turntable and carrying a stylus at its free end, so that the stylus may move radially of a supported record during reproduction of the record, a record-removing device adapted to engage the edge of the record, said device being adjustably mounted adjacent said turntable and adapted when in one position to remove records of one size and when in another position to remove records of a different size, a tone-arm lowering device for placing the tone-arm in initial reproducing position with respect to a record, said lowering device being adjustably mounted adjacent said turntable so as to be movable at will to different positions corresponding respectively to the different positions of said record-removing device, means for raising said tone-arm and moving it into engagement with said lowering device upon completion of the reproduction of a record, means for actuating said record-removing device to remove the reproduced record, and means for adjusting said devices to their said different positions to adapt the mechanism for reproduction of different sized records.

22. In a record reproducing mechanism, a supporting table, a turntable rotatably carried by said supporting table and adapted to support records to be reproduced, a tone-arm pivotally mounted on said supporting table and carrying a stylus at its free end, so that the stylus may move radially of a supported record during reproduction of the record, a record-removing device adapted to engage the edge of the record, said device being movably seated in an opening in said supporting table and adapted when in one position to remove records of one size and when in another position to remove records of a different size, a tone-arm lowering device for placing the tone-arm in initial reproducing position with respect to a record, said lowering device being movably seated in a second opening in said supporting table so as to be movable to different positions corresponding respectively to the different positions of said record-removing device, means for raising said tone-arm and moving it into engagement with said lowering device upon completion of the reproduction of a record, and a manually operable member connecting said devices for moving them simultaneously to adapt the mechanism for reproduction of the different sized records.

23. In an automatic phonograph of the type in which records are placed in a pile on the phonograph turntable, a main frame, a turntable mounted on the frame, a tone arm swingably mounted on the frame, a tone-arm lowering post supported on the frame for stopping and supporting the tone arm in record starting position, stop means comprising a bracket on said tone arm having a slot therein, a screw rotatably supported on said arm, a nut on the screw having a shank extending through the slot and reciprocable therein upon turning of the screw, a vertical portion carried by the nut for engaging a side of said post, a horizontal portion at one side of said vertical portion for engaging the top of said post during normal operation, and means for positioning said tone arm inoperatively comprising a dished surface on the other side of said vertical portion for receiving the top of said post.

PAUL U. LANNERD.